(12) United States Patent
Vasseur et al.

(10) Patent No.: US 7,646,719 B2
(45) Date of Patent: Jan. 12, 2010

(54) INTER-DOMAIN TE-LSP SELECTION

(75) Inventors: Jean-Philippe Vasseur, Dunstable, MA (US); Stefano B. Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 1091 days.

(21) Appl. No.: 11/001,784

(22) Filed: Dec. 2, 2004

(65) Prior Publication Data

US 2006/0120288 A1 Jun. 8, 2006

(51) Int. Cl.
*G01R 31/08* (2006.01)
(52) U.S. Cl. ............................ 370/238; 370/254; 370/392
(58) Field of Classification Search .................. None
See application file for complete search history.

(56) References Cited

U.S. PATENT DOCUMENTS

| | | | |
|---|---|---|---|
| 5,088,032 A | 2/1992 | Bosack | |
| 6,363,319 B1 * | 3/2002 | Hsu | 701/202 |
| 6,392,997 B1 | 5/2002 | Chen | |
| 6,473,421 B1 | 10/2002 | Tappan | |
| 6,584,093 B1 | 6/2003 | Salama et al. | |
| 6,603,756 B1 | 8/2003 | Tappan | |
| 6,643,706 B1 | 11/2003 | Marquez et al. | |
| 6,665,273 B1 | 12/2003 | Goguen et al. | |
| 6,778,492 B2 | 8/2004 | Charny et al. | |
| 6,820,134 B1 * | 11/2004 | Zinin et al. | 709/238 |
| 6,826,186 B1 | 11/2004 | Dittia et al. | |
| 7,082,102 B1 * | 7/2006 | Wright | 370/229 |
| 7,082,140 B1 * | 7/2006 | Hass | 370/466 |
| 7,302,494 B2 * | 11/2007 | Hayashi et al. | 709/239 |
| 7,319,700 B1 * | 1/2008 | Kompella | 370/400 |

| | | |
|---|---|---|
| 2004/0039820 A1 | 2/2004 | Colby et al. |
| 2004/0081154 A1 | 4/2004 | Kouvelas |
| 2004/0215820 A1 | 10/2004 | Blair |

OTHER PUBLICATIONS

Rekhter, Y., RFC 1771, entitled A Border Gateway Protocol 4 (BGP-4), Mar. 1995, pp. 1-54.

U.S. Appl. No. 10/767,574, filed Sep. 18, 2003, Vasseur et al., entitled Computing Inter-Autonomous System MPLS Traffic Engineering LSP Paths.

(Continued)

*Primary Examiner*—Michael J Moore, Jr.
(74) *Attorney, Agent, or Firm*—Cesari and McKenna, LLP (57) ABSTRACT

A technique selects a traffic engineering (TE) label switched path (LSP) from among a plurality of TE-LSPs, each of which spans multiple domains of a computer network from a head-end node of a local domain to a tail-end node of a remote domain, in order to reach one or more address prefixes within the remote domain. The inter-domain TE-LSP selection technique comprises a selection algorithm executed by the head-end node and based on predetermined TE-LSP attributes (e.g., bandwidth, cost, etc.) and/or address prefix reachability attributes (e.g., cost from a tail-end node to the prefix) to select an appropriate inter-domain TE-LSP for the reachable address prefix. The selection algorithm is embodied in one of two modes: (i) a hierarchical selection mode, or (ii) a weighted selection mode. In addition, the technique comprises a load balancing aspect that cooperates with the selection algorithm to enable the head-end node to balance traffic loads among the multiple TE-LSPs based on the results of the selection algorithm.

22 Claims, 5 Drawing Sheets

OTHER PUBLICATIONS

U.S. Patent Application, filed Dec. 1, 2004, Vasseur et al., entitled Inter-Domain TE-LSPS With IGP Extensions.

U.S. Patent Application, filed Dec. 1, 2004, Vasseur et al., entitled Propagation of Routing Information in RSVP-TE for Inter-Domain TE-LSPs.

Callon, R., RFC 1195, entitled Use of OSI ISIS for routing in TCP/IP and Dual Environments, Dec. 1990, pp. 1-80.

Rekhter, Y., RFC 1771, entitled A Border Gateway Protocol 4 (BGP-4), Mar. 1995, pp. 1-28.

Braden, R. et al., RFC 2205, entitled Resource ReSerVation Protocol (RSVP), Version 1 Functional Specification, Sep. 1997, pp. 1-112.

Moy, J., RFC 2328, entitled OSPF Version 2, Apr. 1998, pp. 1-183.

Awduche, D. et al., RFC 3209, entitled RSVP-TE: Extensions to RSVP for LSP Tunnels Dec. 2001, pp. 1-43.

Katz, D. et al., RFC 3630, entitled Traffic Engineering (TE) Extensions to OSPF Version 2, Sep. 2003, pp. 1-14.

Smit, H., RFC 3784, entitled Intermediate-System-to-Intermediate-System (IS-IS) Extensions for Traffic Engineering (TE), Jun. 2004, pp. 1-13.

Mannie, E., RFC 3945, entitled Generalized Multi-Protocol Label Switching (GMPLS) Architecture, Oct. 2004, pp. 1-65.

Mannie, E., RFC 3946, entitled Generalized Multi-Protocol Label Switching (GMPLS) Extensions for Synchronous Optical Network (SONET) and Synchronous Digital Hierarchy (SDH) Control, Oct. 2004, pp. 1-25.

Vasseur, J.P. et al., RSVP Path Computation Request and Reply Messages (draft-vasseur-mpls-computation-rsvp-05.txt), Internet Draft, Jul. 2004, pp. 1-31.

* cited by examiner

INTER-DOMAIN TE-LSP SELECTION

RELATED APPLICATIONS

This application is related to U.S. application Ser. No. 11/001,349, entitled PROPAGATION OF ROUTING INFORMATION IN RSVP-TE FOR INTER-DOMAIN TE-LSPS, and U.S. application Ser. No. 11/001,459, entitled INTER-DOMAIN TE-LSP WITH IGP EXTENSIONS, both filed by Vasseur et al. on Dec. 1, 2004, the contents of both which are hereby incorporated in their entirety.

BACKGROUND OF THE INVENTION

1. Field of the Invention

The present invention relates to computer networks and more particularly to selecting a traffic engineering (TE) label switched path (LSP) from a plurality of TE-LSPs that span multiple domains of a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to inter-connect nodes of the various ASes. Moreover, it may be desirable to interconnect various ASes that are operated under different administrative domains. As used herein, an AS or an area is generally referred to as a "domain," and a router that interconnects different domains together is generally referred to as a "border router."

An example of an interdomain routing protocol is the Border Gateway Protocol version 4 (BGP), which performs routing between domains (ASes) by exchanging routing and reachability information among neighboring interdomain routers of the systems. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol 4 (BGPx-4)*, published March 1995.

Examples of an intradomain routing protocol, or an interior gateway protocol (IGP), are the Open Shortest Path First (OSPF) routing protocol and the Intermediate-System-to-Intermediate-System (ISIS) routing protocol. The OSPF and ISIS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version 2*, dated April 1998 and the ISIS protocol used in the context of IP is described in RFC 1195, entitled *Use of OSI ISIS for routing in TCP/IP and Dual Environments*, dated December 1990, both of which are hereby incorporated by reference.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

Multi-Protocol Label Switching (MPLS) Traffic Engineering has been developed to meet data networking requirements such as guaranteed available bandwidth or fast restoration. MPLS Traffic Engineering exploits modern label switching techniques to build guaranteed bandwidth end-to-end tunnels through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, availability of backup bypass tunnels for each link and node included in the path, etc. Path computation can either be performed by the head-end LSR or by some other entity operating as a path computation element (PCE). The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE-LSPs can be configured within a single domain, e.g., area, level, or AS, or may also span multiple domains, e.g., areas, levels, or ASes.

One difficulty that arises in crossing domain boundaries is that path computation at the head-end LSR requires knowledge of network topology and resources across the entire network between the head-end and the tail-end LSRs. Yet service providers typically do not share this information with each other across domain borders. In particular, network topology and resource information do not generally flow across area boundaries even though a single service provider may operate all the areas or levels. Neither the head-end LSR nor any single PCE will have sufficient knowledge to compute a path. Because of this, MPLS Traffic Engineering path computation techniques are required to compute inter-domain TE-LSPs.

The use of PCEs has been adapted to create a distributed PCE architecture, in order to extend MPLS TE-LSPs across domain boundaries. An example of such a distributed architecture is described in commonly-owned copending U.S. patent application Ser. No. 10/767,574, entitled COMPUTING INTER-AUTONOMOUS SYSTEM MPLS TRAFFIC ENGINEERING LSP PATHS, filed by Vasseur et al., on Sep. 18, 2003, the contents of which are hereby incorporated by reference in its entirety. In a distributed PCE architecture, the visibility needed to compute paths is extended between adjacent domains so that PCEs may cooperate to compute paths across multiple domains by exchanging virtual shortest path trees (VSPTs) while preserving confidentiality across domains (e.g., when applicable to ASes).

Occasionally, a head-end LSR or node will have multiple TE-LSPs into a particular "remote" domain (e.g., area or level) outside of its own "local" domain. These inter-domain TE-LSPs may terminate at either a single tail-end LSR or node of the remote domain, or at different tail-end nodes within the same remote domain, depending upon their initial setup. Knowledge of nodes or prefixes contained within the remote domain of the tail-end node can be acquired, e.g., via static or policy-based routing, which generally requires manual configuration by a system administrator with prior knowledge of the network topology. Other methods for obtaining this "reachability information" include the dynamic methods described in previously incorporated application Ser. Nos. 11/001,349 and 11/001,459, using various protocol extensions to transmit the information. A known limitation of multiple inter-domain TE-LSPs lies in the inability to efficiently select (e.g., at a head-end node in the local domain) which particular TE-LSP to use when attempting to reach a particular reachable prefix (e.g., in the remote domain), should there be a plurality of TE-LSPs available to reach a particular prefix. Current methods to select a particular TE-LSP involve the use of static or policy-based routing (manual configuration), which can be cumbersome and limited in their applicability, and in some cases (e.g., misconfiguration) can be the cause of network failure.

SUMMARY OF THE INVENTION

The present invention is directed to a technique for selecting a traffic engineering (TE) label switched path (LSP) from among a plurality of TE-LSPs, each of which spans multiple domains of a computer network from a head-end node of a local domain to a tail-end node of a remote domain, in order to reach one or more address prefixes within the remote domain. The novel inter-domain TE-LSP selection technique comprises a selection algorithm executed by the head-end node and based on predetermined TE-LSP attributes (e.g., bandwidth, cost, etc.) and/or address prefix reachability attributes (e.g., cost from a tail-end node to the prefix) to select an appropriate inter-domain TE-LSP for the reachable address prefix. Notably, the selection algorithm is embodied in one of two modes: (i) a hierarchical selection mode, or (ii) a weighted selection mode. In addition, the technique comprises a load balancing aspect that cooperates with the selection algorithm to enable the head-end node to balance traffic loads among the multiple TE-LSPs based on the selected results.

In accordance with the hierarchical selection mode, the head-end node examines each TE-LSP attribute in a hierarchical manner by order of preference for each address prefix reachable by the inter-domain TE-LSPs. Once an appropriate TE-LSP is realized for a preferred TE-LSP attribute, the selection algorithm stops and that appropriate TE-LSP is selected to reach the address prefix in the remote domain. Otherwise, the algorithm continues to evaluate a next preferred TE-LSP attribute within the hierarchical order. If all attributes are similar to more than one TE-LSP, the head-end node randomly selects an appropriate TE-LSP. Moreover, if more than one TE-LSP has a similar preferred TE-LSP attribute at any stage of the hierarchical order, the head-end node may invoke the load balancing aspect of the invention to select each of those TE-LSPs to reach the address prefix and balance the traffic loads (proportionally or otherwise) across them.

In accordance with the weighted selection mode, the head-end node evaluates an objective polynomial function for each of the inter-domain TE-LSPs. The polynomial function comprises a plurality of sub-functions, wherein each sub-function is configured to characterize the preference of a TE-LSP attribute. Moreover, each sub-function includes a variable that characterizes a configurable weight applied to the attribute. For each address prefix reachable by the inter-domain TE-LSPs, the polynomial function characterizes the overall preference of the TE-LSPs and the TE-LSP with the highest preference is selected.

Specifically, for a reachable address prefix, the head-end node compares a resulting value generated by the polynomial function for each inter-domain TE-LSP and selects an appropriate TE-LSP with the best (e.g., highest) resulting value. Notably, the selection of a TE-LSP is based on the relative importance of the TE-LSP attributes. The relative importance of an attribute is illustratively manifested by the configurable weighting applied to that attribute. As with the hierarchical selection mode, if the resulting polynomial function values for two or more inter-domain TE-LSPs are equal, the head-end node randomly selects an appropriate TE-LSP from those TE-LSPs. Also, if more than one TE-LSP has the same resulting value or falls within an acceptable range of values, the head-end node may invoke the load balancing aspect of the invention to select each of those TE-LSPs to reach the address prefix and balance the traffic loads (proportionally or otherwise) across them.

Advantageously, the novel technique enables efficient selection of a TE-LSP (or multiple TE-LSPs for load balancing) from among a plurality of TE-LSPs that span multiple domains in order to reach an address prefix in a domain that is remote from the head-end node domain. By providing a dynamically selectable technique, the invention provides an alternative to sub-optimal selection techniques, such as cumbersome manual configuration (e.g., static routing or policy routing), that can avoid some of the risks and possible errors created in such sub-optimal selection techniques.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1A:
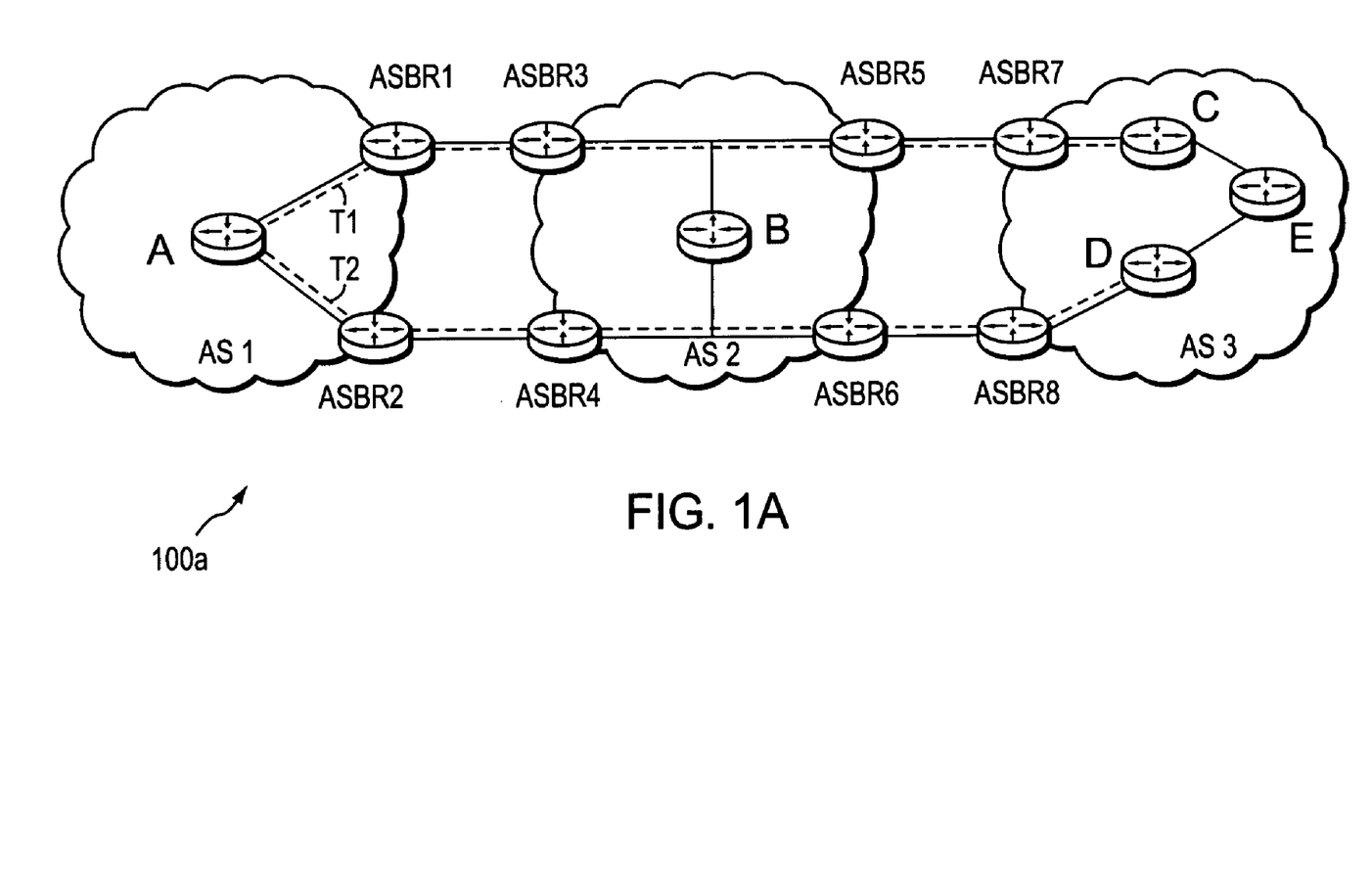
FIG. 1A is a schematic block diagram of an exemplary computer network of autonomous systems that may be used in accordance with the present invention.

FIG. 1A is a schematic block diagram of an exemplary computer network 100a comprising autonomous systems AS1 and AS3 interconnected by autonomous system AS2. An Autonomous System (AS) is herein defined to be a group of intermediate nodes, such as intradomain routers, within a network that are subject to a common authority and execute one or more intradomain routing protocols. Although each AS is illustratively an autonomous system, those skilled in the art will appreciate that the ASes may alternatively be configured as routing domains or other networks or subnetworks. The autonomous system AS1 includes intradomain routers, such as AS border routers ASBR1 and ASBR2, through which communication, such as data packets, may pass into and out of the AS to AS border routers ASBR3 and ASBR4, respectively of AS2. AS2 also includes AS border routers ASBR5 and ASBR6 in communication with border routers ASBR7 and ASBR8 of AS3. Moreover, within AS1 and AS2, there are exemplary intradomain routers A and B, respectively, and in AS3 there are exemplary intra-domain routers C, D, and E. Those skilled in the art will understand that any number of routers may be used in the ASes, and that the view shown herein is for simplicity.

Data packets may be exchanged among the autonomous systems AS1-AS3 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers within an AS using predetermined "interior" gateway protocols (IGPs), such as conventional distance-vector protocols or, illustratively, link-state protocols, through the use of link-state advertisements or link-state packets. In addition, data packets containing network routing information may be exchanged among the autonomous systems AS1-AS3 using "external" gateway protocols, such as the Border Gateway Protocol (BGP).

Figure 1B:
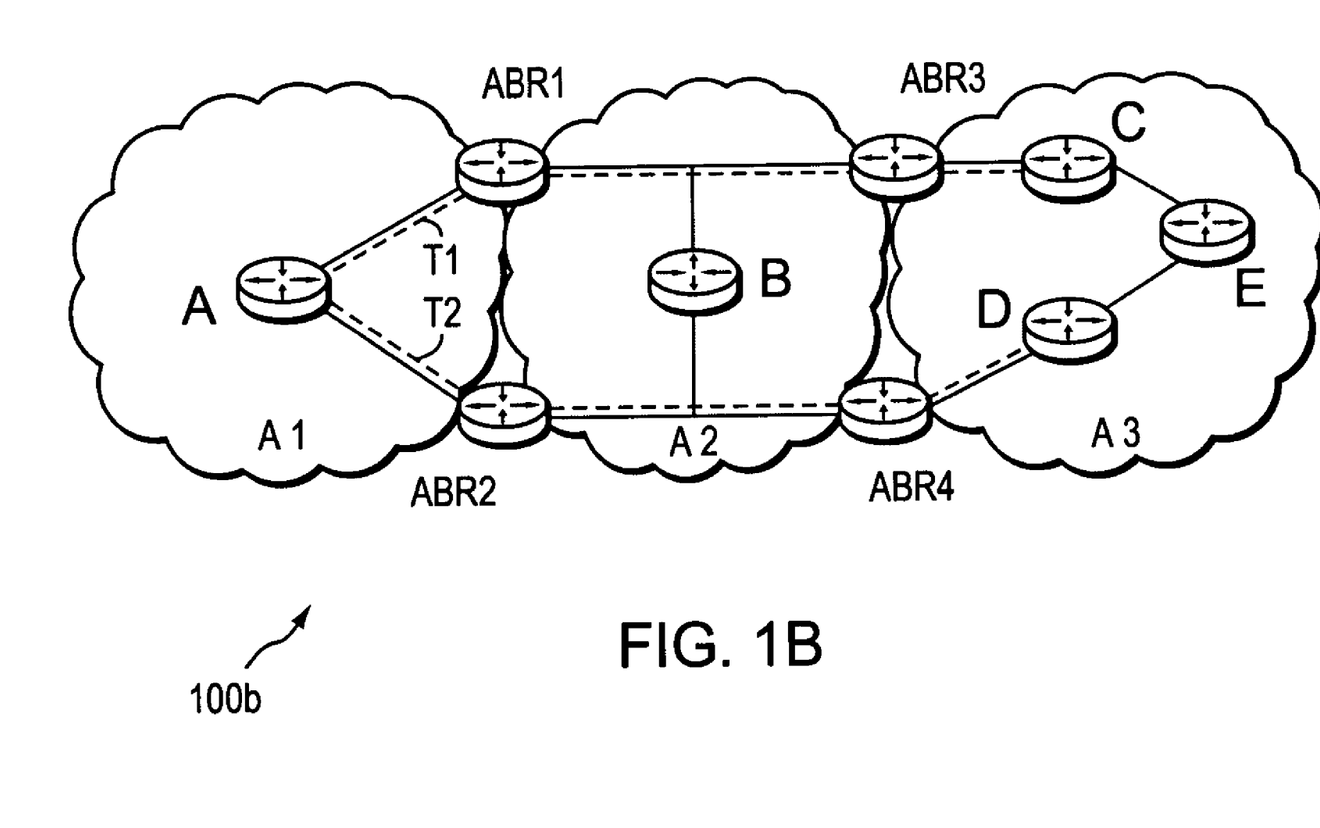
FIG. 1B is a schematic block diagram of an exemplary computer network of areas that may be used in accordance with the present invention.

FIG. 1B is a schematic block diagram of an exemplary computer network 100b comprising areas A1 and A2 having exemplary intradomain routers A and B, respectively, and area A3, which has exemplary intradomain routers C, D, and E. In addition, A1 and A2 share area border routers ABR1 and ABR2, while A2 and A3 share ABR3 and ABR4. As used herein, an area is a collection of routers that share full network topology information with each other but not necessarily with routers outside the area. A collection of areas may be contained within a single AS. The term area as used herein also encompasses the term "level" which has a similar meaning for networks that employ IS-IS as their IGP, in which case the area border routers ABR1-4 are embodied as level 1/level 2 (L1L2) routers. These examples are merely representative. It will be understood by those skilled in the art that wherever areas or levels are referred to, autonomous systems may be used also. Areas, levels, and autonomous systems are generally referred to herein as "domains." Also, the terms ABR, L1L2 router, ASBR, and more generally, border routers, are used interchangeably herein.

Figure 2:
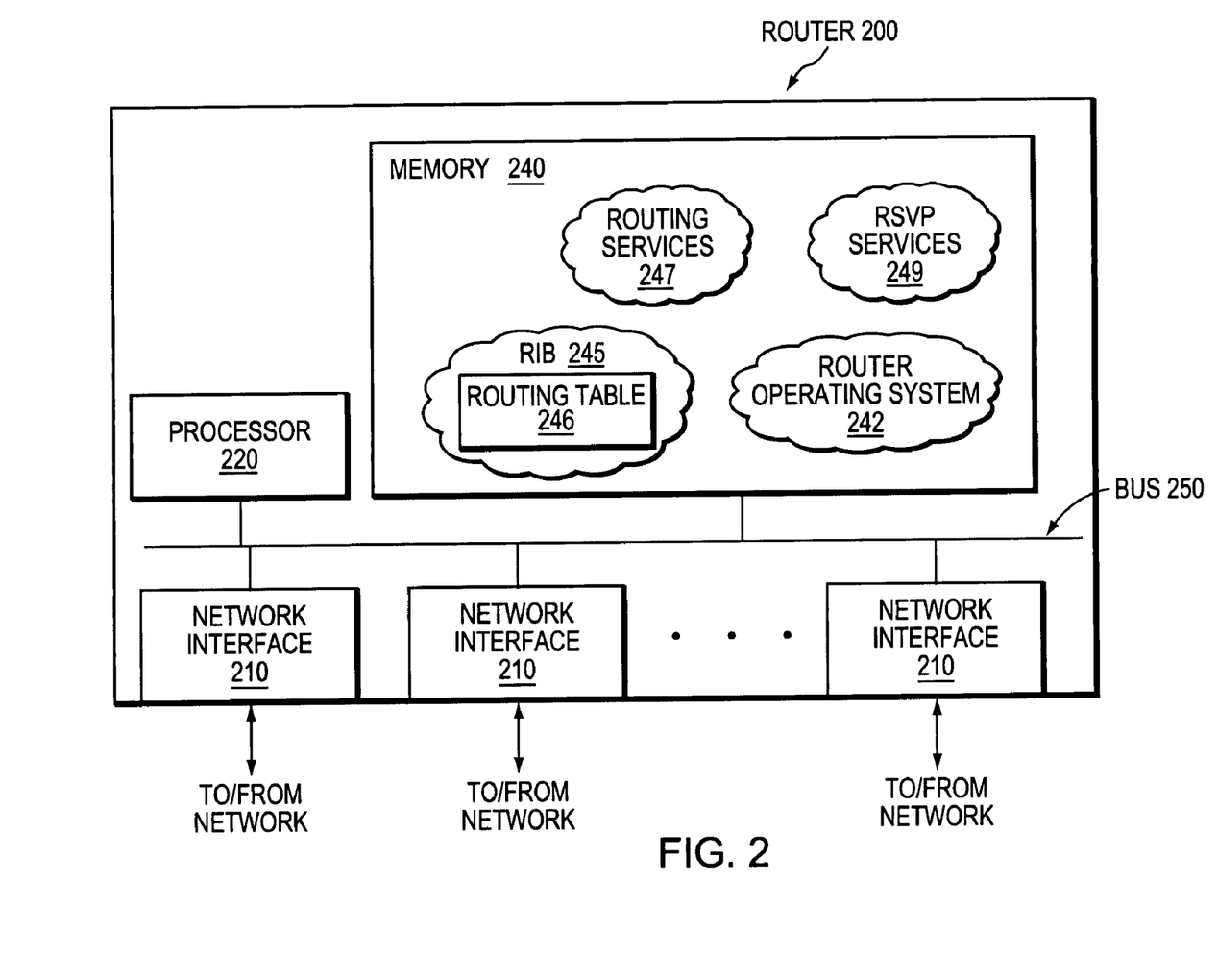
FIG. 2 is schematic block diagram of an exemplary router that may be advantageously used with the present invention.

FIG. 2 is a schematic block diagram of an exemplary router 200 that may be advantageously used with the present invention as an intradomain router or a border router. The router comprises a plurality of network interfaces 210, a processor 220, and a memory 240 interconnected by a system bus 250. The network interfaces 210 contain the mechanical, electrical and signaling circuitry for communicating data over physical links coupled to the network 100a,b. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as routing table 246. A router operating system 242, portions of which are typically resident in memory 240 and executed by the processor, functionally organizes the router by, inter alia, invoking network operations in support of software processes and/or services executing on the router. These software processes and/or services include Routing Information Base (RIB) 245, routing services 247, and RSVP services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as OSPF and IS-IS. These functions may be configured to manage a forwarding information data-base (not shown) containing, e.g., data used to make forwarding decisions. RSVP services 249 contain computer executable instructions for implementing RSVP and processing RSVP messages in accordance with the present invention. RSVP is described in R. Braden, et al., *Resource ReSerVation Protocol (RSVP)*, Request For Comments (RFC) 2205, September 1997, available from the IETF and which is hereby incorporated by reference as though fully set forth herein, and in RFC 3209, entitled *RSVP-TE: Extensions to RSVP for LSP Tunnels*, as incorporated above.

Routing table 246 is illustratively resident in memory 240 and used to store routing information, including reachable destination address prefixes and associated attributes. These attributes include next-hop information used by router 200 to reach the destination prefixes and an associated metric (e.g., cost) of reaching the destination prefixes. The routing table 246 is illustratively maintained and managed by RIB 245. To that end, the RIB 245 maintains copies of routes (paths) provided by the routing protocols, such as BGP and IGP, in order to compute best paths/routes for installation into the routing table 246.

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop.

The paths taken by packets that traverse the network in this manner are referred to as label switched paths (LSPs) or Traffic Engineering (TE)-LSPs. Examples of such TE-LSPs are shown as dotted lines between a head-end node (A) and a tail-end node (C), e.g., T1, and between the head-end node (A) and a tail-end node (D), e.g., T2, in FIGS. 1A and 1B. Establishment of a TE-LSP requires computation of a path, signaling along the path, and modification of forwarding tables along the path. MPLS TE establishes LSPs that have guaranteed bandwidth under certain conditions. Illustratively, the TE-LSPs may be signaled through the use of the RSVP protocol and, in particular, RSVP TE signaling messages.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

To compute paths across multiple domains, previously incorporated U.S. application Ser. No. 10/767,574 describes the use of a virtual shortest path tree (VSPT) algorithm in a distributed path computation element (PCE) architecture. Notably, it will be apparent to those skilled in the art that other methods may be used to compute the TE-LSPs (e.g., explicit paths, etc.), and such methods are within the scope of the present invention. Furthermore, the path computation request (and response) can be implemented in accordance with a protocol specified in Vasseur, et al. *RSVP Path Computation Request and Reply Messages*, Internet Draft, July 2004, which is hereby incorporated by reference as though fully set forth herein.

During the establishment of TE-LSPs, a variety of techniques are available to determine, at the domain of the head-end node (i.e., the local domain) the nodes or prefixes resident within the domain of the tail-end node (i.e., the remote domain). Such techniques include, inter alia, static or policy-based routing, or dynamic methods, such as those described in previously incorporated application Ser. Nos. 11/001,349 and 11/001,459. Through these and other known techniques, it may be possible to obtain TE-LSP attributes, or "metrics," (e.g., bandwidth, cost, etc.) of the TE-LSP from the head-end node to the tail-end node, as well as the additional attributes to reach the nodes or prefixes from the TE-LSP tail-end node.

The present invention is directed to a technique for selecting a TE-LSP from among a plurality of TE-LSPS, each of which spans multiple domains of a computer network from a head-end node of a local domain to a tail-end node of a remote domain, in order to reach one or more address prefixes within the remote domain. The novel inter-domain TE-LSP selection technique comprises a selection algorithm executed by the head-end node and based on predetermined TE-LSP attributes (e.g., bandwidth, cost, etc.) and/or address prefix reachability attributes (e.g., cost from a tail-end node to the prefix) to select an appropriate inter-domain TE-LSP for the reachable address prefix. Notably, the selection algorithm is embodied in one of two modes: (i) a hierarchical selection mode, or (ii) a weighted selection mode. In addition, the technique comprises a load balancing aspect that cooperates with the selection algorithm to enable the head-end node to balance traffic loads among the multiple TE-LSPs based on the results of the selection algorithm.

Consider, for example, TE-LSPs T1 and T2 of FIGS. 1A and 1B above. Assume, in accordance with the MPLS and RSVP methods described herein, that T1 has a bandwidth of 60 Mega-bytes per second (MBps) and a cost of 15, and that T2 has a bandwidth of 50 MBps and a cost of 20. Head-end node A learns that a prefix, IP1, is reachable via the tail-ends of both T1 and T2 through node E (e.g., by various techniques referenced above.) The cost (e.g., IGP cost) to reach IP1 from T1's tail-end node C is 15 and the cost from T2's tail-end node D is 1. Notably, this configuration results in a total cost to IP1 along T1 of 30, and a total cost to IP1 along T2 of 21.

In accordance with the hierarchical selection mode, the head-end node examines each TE-LSP attribute in a hierarchical manner by order of preference for each address prefix reachable by the inter-domain TE-LSPs. Once an appropriate TE-LSP is realized for a preferred TE-LSP attribute, the selection algorithm stops and that appropriate TE-LSP is selected to reach the address prefix in the remote domain. Otherwise, the algorithm continues to evaluate a next preferred TE-LSP attribute within the hierarchical order. If all attributes are similar to more than one TE-LSP, the head-end node randomly selects an appropriate TE-LSP. Moreover, if more than one TE-LSP has a similar preferred TE-LSP attribute at any stage of the hierarchical order, the head-end node may invoke the load balancing aspect of the invention to select each of those TE-LSPs to reach the address prefix and balance the traffic loads (proportionally or otherwise) across them.

Figure 3:
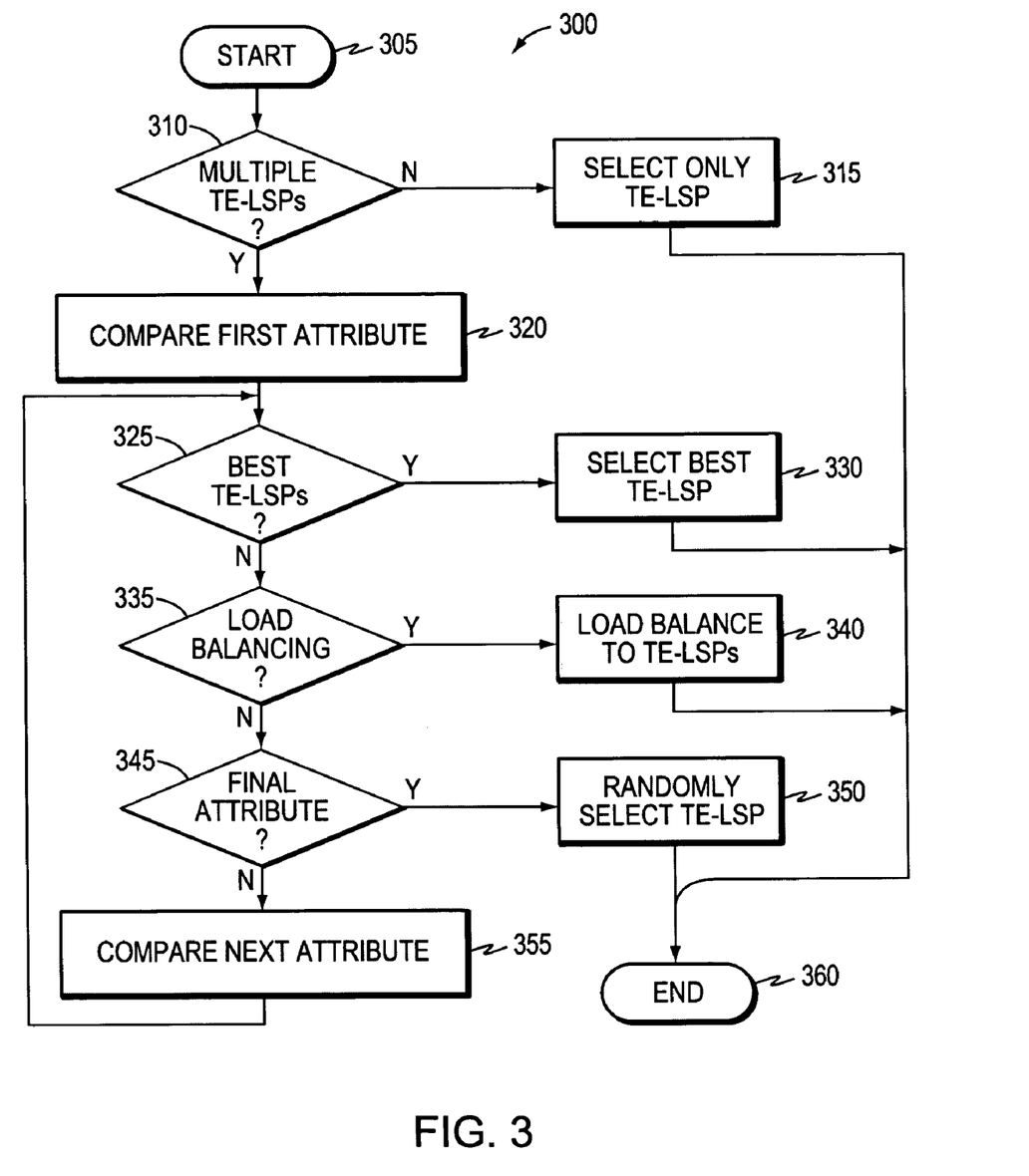
FIG. 3 is a flowchart illustrating a sequence of steps for selecting a TE-LSP based on a hierarchical selection mode in accordance with the present invention.

FIG. 3 is a flowchart illustrating a sequence of steps for selecting a TE-LSP based on the hierarchical selection mode in accordance with the present invention. The sequence 300 starts at step 305 and continues to step 310, where the head-end node (A) determines if there are multiple TE-LSPs available to reach a particular destination prefix (IP1). Note that, in the illustrative embodiment, the RIB 245 of the head-end node is the process executing the novel algorithm. If there is only one available TE-LSP, e.g., T1, the RIB 245 selects that TE-LSP in step 315. However if there are multiple TE-LSPs available to reach prefix IP1, e.g., T1 and T2, a first preferred TE-LSP attribute is compared among those TE-LSPs in step 320. If one TE-LSP offers a "best" value for the first preferred attribute in step 325, the RIB 245 selects that TE-LSP as the appropriate (best) TE-LSP to reach IP1 in step 330.

If there is no best TE-LSP, but rather there is a set of matching (or closely matching within a configured range) TE-LSPs, the RIB 245 determines if it has been configured to operate with the load balancing aspect of the invention in step 335. If so, the head-end node balances the traffic load bound for IP1 over the set of TE-LSPs in step 340. Notably, the traffic may be load balanced proportionally to the closely matching range of the preferred attribute (e.g., according to differing bandwidths) or, in the case of matching first preferred attributes, according to another (e.g., the next) attribute (e.g., differing bandwidths, in the event the first preferred attribute is total cost). Such a load balancing technique is also referred to as asymmetrical load balancing.

In the event it is not configured to load balance, the RIB 245 determines in step 345 if the final preferred TE-LSP attribute has been compared. If so, the RIB randomly selects a TE-LSP of the set of matching TE-LSPs to reach the prefix in step 350. Otherwise, the next preferred attribute is compared among the remaining set of matching TE-LSPs in step 355, and the process returns to step 325 to determine a best TE-LSP. Once one or more TE-LSPs are chosen to reach the prefix, the sequence ends in step 360.

As an example, if the order of preference for the TE-LSP attributes examined in accordance with the hierarchical mode is (1) bandwidth of the TE-LSP, followed by (2) total cost to reach the prefix and (3) TE-LSP cost, TE-LSP T1 (A to C) is chosen over T2 (a bandwidth of 60 MBps versus 50 MBps). If two or more TE-LSPs have equal bandwidth, the TE-LSP with the lowest total cost is selected, and so on. As another example, if the total cost is preferred over bandwidth, TE-LSP T2 (A to D) is chosen over T1 (a cost of 21 versus 30).

In accordance with the weighted selection mode, the head-end node evaluates an objective polynomial function for each of the inter-domain TE-LSPs. The polynomial function comprises a plurality of sub-functions, wherein each sub-function is configured to characterize the preference of a TE-LSP attribute. Moreover, each sub-function includes a variable that characterizes a configurable weight applied to the attribute. For each address prefix reachable by the inter-domain TE-LSPs, the polynomial function characterizes the overall preference of the TE-LSPs and the TE-LSP with the highest preference is selected.

Specifically, for a reachable address prefix, the head-end node compares a resulting value generated by the polynomial function for each inter-domain TE-LSP and selects an appropriate TE-LSP with the best (e.g., highest) resulting value. Notably, the selection of a TE-LSP is based on the relative importance of the TE-LSP attributes. The relative importance of an attribute is illustratively manifested by the configurable weighting applied to that attribute.

An illustrative example of the polynomial function is:

$$V=[W1*f(A1)]+[W2*f(A2)]+ \ldots +[Wn*f(An)]$$

Where V is the resulting value of a particular TE-LSP, W1-Wn are the configurable weights, and f(A1)-f(An) are the sub-functions configured to characterize the preference of the TE-LSP attributes. Weights W1-Wn may comprise any user-configurable value, such as a percentage or other number from zero to substantially infinity. Examples of TE-LSP attributes A1-An include, inter alia, the TE-LSP bandwidth (A1), the TE-LSP cost (A2), and a total (IGP) cost (A3) from the head-end node (A) to the prefix (IP1). Notably, the attributes are characterized because for certain attributes, a lower value may be preferred over a higher value (i.e., cost). In this instance, an example characterization function would be to take the inverse value of the attribute (i.e., f(A1)=1/A1). Other characterization functions will be understood by those skilled in the art, and such additional functions are within the scope of protection of the present invention.

As with the hierarchical selection mode, if the resulting polynomial function values for two or more inter-domain TE-LSPs are equal, the head-end node randomly selects an appropriate TE-LSP from those TE-LSPs. Also, if more than one TE-LSP has the same resulting value or falls within an acceptable range of values, the head-end node may invoke the load balancing aspect of the invention to select each of those TE-LSPs to reach the address prefix and balance the traffic loads (proportionally or otherwise) across them. In this case, the load balancing may be done with respect to a particular preference, or with respect to the resulting polynomial function values.

Figure 4:
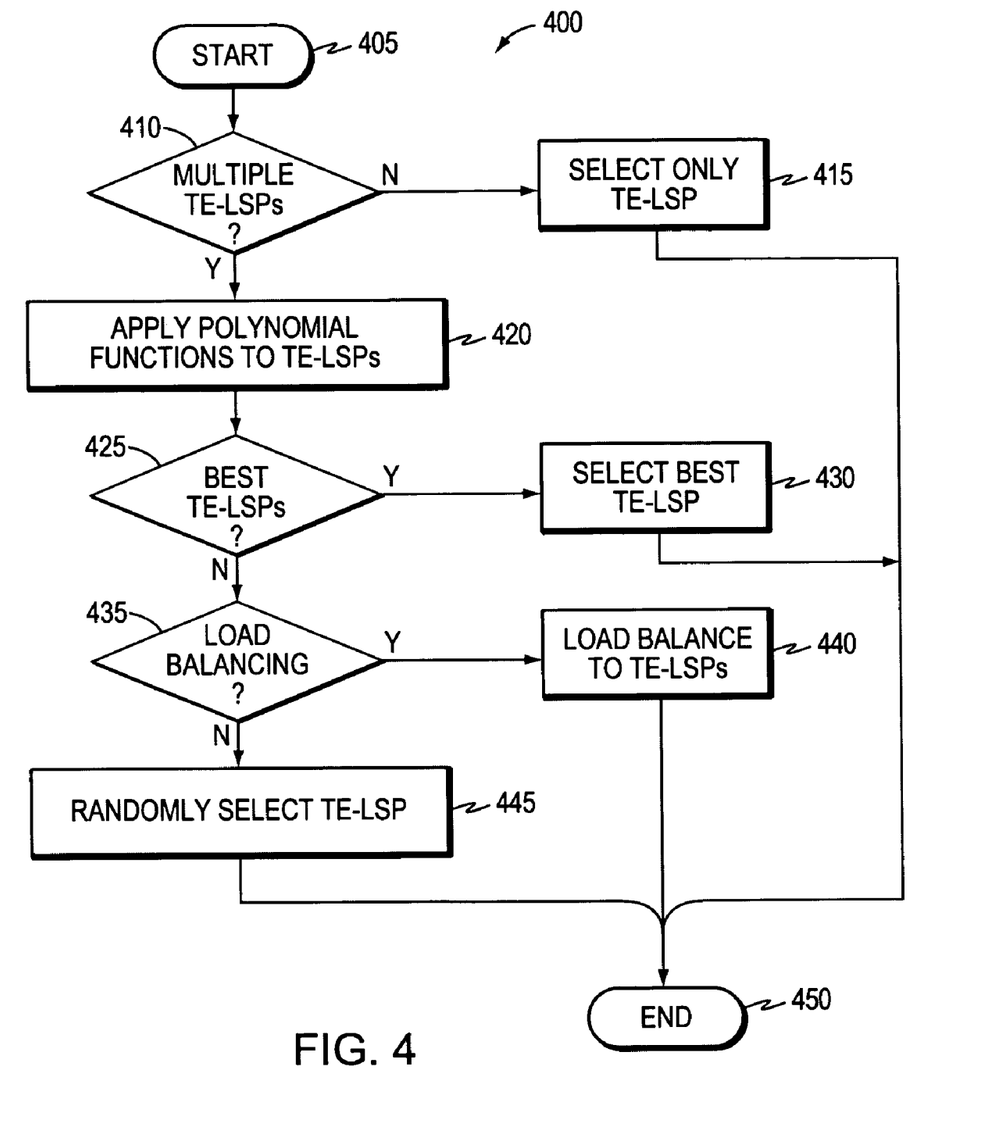
FIG. 4 is a flowchart illustrating a sequence of steps for selecting a TE-LSP based on a weighted selection mode in accordance with the present invention.

FIG. 4 is a flowchart illustrating a sequence of steps for selecting a TE-LSP based on the weighted selection mode in accordance with the present invention. The sequence 400 starts at step 405 and continues to step 410, where the head-end node (A) determines if there are multiple TE-LSPs available to reach a particular destination prefix (IP1). Note that, again, the RIB 245 of the head-end node is illustratively the process executing the novel algorithm. If there is only one available TE-LSP, e.g., T1, the RIB 245 selects that TE-LSP in step 415. However if there are multiple TE-LSPs available to reach prefix IP1, e.g., T1 and T2, the objective polynomial function is applied to the multiple TE-LSPs in step 420.

If one of the multiple TE-LSPs has the best resulting value for the objective function in step 425, the RIB 245 selects that best TE-LSP to reach IP1 in step 430. If there is no best TE-LSP, but rather there is a set of matching (or closely matching within a configured range) TE-LSPs, the RIB 245 determines if it has been configured to operate with the load balancing aspect of the invention in step 435. If so, the head-end node balances the traffic load bound for IP1 over the set of TE-LSPs in step 440. Notably, the traffic may be load balanced proportionally according to the resulting value, or it may be load balanced according to one of the particular attributes (e.g., according to differing bandwidths). In the event it is not configured to load balance, the RIB 245 randomly selects a TE-LSP of the set of matching TE-LSPs to reach the prefix in step 445. Once one or more TE-LSPs are chosen to reach the prefix, the sequence ends in step 450.

As a first example, assume the following weight values (for attributes A1-A3 as noted above) are defined by a user as: W1=0.05; W2=10; and W3=20. The user also defines the functions f(A2) and f(A3) as inverse functions, because they are both cost values. Using these values for T1 and T2, the head-end node (e.g., RIB 245) evaluates the objective polynomial function for each inter-domain TE-LSP as:

$$V(T1)=[0.05*60]+[10*1/15]+[20*1/30]=3+0.66+ \\ 0.66+32\ 4.32$$

and $$V(T2)=[0.05*50]+[10*1/20]+[20*1/21]=2.5+0.5+ \\ 0.95=3.95$$

Accordingly, the head-end node (A) chooses TE-LSP T1 to reach the prefix (IP1), because V(T1) is a better (e.g., higher) value than V(T2).

As a second example, assume that the user defines a different set of weight values for the same scenario, namely W1=0.05; W2=15; and W3=80. The user again defines the functions f(A2) and f(A3) as inverse functions. Using these values for T1 and T2, the head-end node (e.g., RIB 245) evaluates the objective polynomial function for each inter-domain TE-LSP as:

$$V(T1)=[0.05*60]+[15*1/15]+[80*1/30]=3+1+2.66=6.66$$

and $$V(T2)=[0.05*50]+[15*1/20]+[80*1/21]=2.5+0.75+3.8=7.05$$

Here, since the total cost is more preferred than the previous example, the head-end node (A) chooses TE-LSP T2 to reach the prefix (IP1), because V(T2) is a better (e.g., higher) value than V(T1).

Advantageously, the novel technique enables efficient selection of a TE-LSP (or multiple TE-LSPs for load balancing) from among a plurality of TE-LSPs that span multiple domains in order to reach an address prefix in a domain that is remote from the head-end node domain. By providing a dynamically selectable technique, the invention provides an alternative to sub-optimal selection techniques, such as cumbersome manual configuration (e.g., static routing or policy routing), that can avoid some of the risks and possible errors created in such sub-optimal selection techniques.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Furthermore, it should be noted that the weights, attributes, and functions used in the examples described herein are to be taken merely as exemplary, and that other values could be used that are within the scope of the present invention. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for selecting a traffic engineering (TE) label switched path (LSP) from among a plurality of TE-LSPs, each TE-LSP spanning multiple domains of a computer network from a local domain to a remote domain in order to reach one or more address prefixes within the remote domain, the method comprising:

executing a hierarchical selection algorithm at a head-end node of the local domain, the hierarchical selection algorithm based on predetermined TE-LSP attributes of the inter-domain TE-LSPs and configured to select one or more appropriate TE-LSPs for the reachable address prefix by examining attributes in a hierarchical manner by order of predetermined preference for each address prefix reachable by the TE-LSPs, and selecting one or more appropriate TE-LSPs for a preferred TE-LSP attribute to reach the address prefix in the remote domain; and invoking load balancing, in cooperation with the hierarchical selection algorithm, to enable the head-end node to balance traffic loads among the one or more appropriate selected TE-LSPs.

2. The method of claim 1, further comprising: randomly selecting one or more appropriate TE-LSPs in the event all examined attributes are similar to more than one TE-LSP.

3. A method for selecting a traffic engineering (TE) label switched path (LSP) from among a plurality of TE-LSPs, each TE-LSP spanning multiple domains of a computer network from a local domain to a remote domain in order to reach one or more address prefixes within the remote domain, the method comprising:

executing a weighted selection algorithm at a head-end node of the local domain, the weighted selection algorithm based on predetermined TE-LSP attributes of the inter-domain TE-LSPs and configured to select one or more appropriate TE-LSPs for the reachable address prefix by evaluating an objective polynomial function for each of the TE-LSPs, the polynomial function configured to characterize the overall preference of the TE-LSPs, and selecting the one or more TE-LSPs with the highest overall preference to reach the address prefix in the remote domain; and invoking load balancing, in cooperation with the weighted selection algorithm, to enable the head-end node to balance traffic loads among the one or more appropriate selected TE-LSPs.

4. The method of claim 3, wherein the polynomial function comprises a plurality of sub-functions, wherein each sub-function is configured to characterize the preference of a TE-LSP attribute.

5. The method of claim 4, wherein each sub-function includes a variable that characterizes a configurable weight applied to the attribute.

6. The method of claim 3, further comprising: randomly selecting one or more appropriate TE-LSPs in the event all examined attributes are similar to more than one TE-LSP.

7. The method of claim 3, wherein the predetermined TE-LSP attributes comprise bandwidth and cost attributes.

8. The method of claim 3, further comprising: executing the weighted selection algorithm based on predetermined prefix attributes of reaching the address prefix from a tail-end node of the TE-LSPs.

9. A system for selecting a traffic engineering (TE) label switched path (LSP) from among a plurality of TE-LSPs, each TE-LSP spanning multiple domains of a computer network from a local domain to a remote domain in order to reach one or more address prefixes within the remote domain, the system comprising:

a head-end node of the TE-LSPs in the local domain; and a routing information base (RIB) of the head-end node, the RIB executing (i) a hierarchical selection algorithm based on predetermined TE-LSP attributes of the inter-domain TE-LSPs and configured to select one or more appropriate TE-LSPs for the reachable address prefix by examination of attributes in a hierarchical manner by order of predetermined preference for each address prefix reachable by the TE-LSPs, and selection of one or more appropriate TE-LSPs for a preferred TE-LSP attribute to reach the address prefix in the remote domain and (ii) a load balancing algorithm, in cooperation with the hierarchical selection algorithm, to enable the head-end node to balance traffic loads among the one or more appropriate selected TE-LSPs.

10. A system for selecting a traffic engineering (TE) label switched path (LSP) from among a plurality of TE-LSPs, each TE-LSP spanning multiple domains of a computer network from a local domain to a remote domain in order to reach one or more address prefixes within the remote domain, the system comprising:
- a head-end node of the TE-LSPs in the local domain; and
- a routing information base (RIB) of the head-end node, the RIB executing (i) a weighted selection algorithm based on predetermined TE-LSP attributes of the inter-domain TE-LSPs and configured to select one or more appropriate TE-LSPs for the reachable address prefix with an objective polynomial function to be evaluated for each of the TE-LSPs, the polynomial function configured to characterize the overall preference of the TE-LSPs, wherein the head-end node selects the one or more TE-LSPs with the highest overall preference to reach the address prefix in the remote domain and (ii) a load balancing algorithm, in cooperation with the selection algorithm, to enable the head-end node to balance traffic loads among the appropriate selected TE-LSPs.

11. The system of claim 10, further comprising: a plurality of sub-functions within the polynomial function, wherein each sub-function is configured to characterize the preference of a TE-LSP attribute.

12. The system of claim 11, wherein each sub-function includes a variable that characterizes a configurable weight applied to the attribute.

13. The system of claim 10, wherein the predetermined TE-LSP attributes comprise bandwidth and cost attributes.

14. The system of claim 10, wherein the weighted selection algorithm is based on predetermined prefix attributes of reaching the address prefix from a tail-end node of the TE-LSPs.

15. An apparatus for selecting a traffic engineering (TE) label switched path (LSP) from among a plurality of TE-LSPs, each TE-LSP spanning multiple domains of a computer network from a local domain to a remote domain in order to reach one or more address prefixes within the remote domain, the apparatus comprising:
- means for executing a weighted selection algorithm at a head-end node of the local domain, the selection algorithm based on predetermined TE-LSP attributes of the inter-domain TE-LSPs and configured to select one or more appropriate TE-LSPs for the reachable address prefix by evaluation of an objective polynomial function for each of the TE-LSPs, the polynomial function configured to characterize the overall preference of the TE-LSPs, and selection of the one or more TE-LSPs with the highest overall preference to reach the address prefix in the remote domain; and
- means for invoking load balancing, in cooperation with the weighted selection algorithm, to enable the head-end node to balance traffic loads among the one or more appropriate selected TE-LSPs.

16. A computer readable medium containing executable program instructions for selecting a traffic engineering (TE) label switched path (LSP) from among a plurality of TE-LSPs, each TE-LSP spanning multiple domains of a computer network from a local domain to a remote domain in order to reach one or more address prefixes within the remote domain, the executable program instructions comprising program instructions for:
- executing a hierarchical selection algorithm at a head-end node of the local domain, the selection algorithm based on predetermined TE-LSP attributes of the inter-domain TE-LSPs and configured to select one or more appropriate TE-LSPs for the reachable address prefix by examination of attributes in a hierarchical manner by order of predetermined preference for each address prefix reachable by the TE-LSPs, and selection of one or more appropriate TE-LSPs for a preferred TE-LSP attribute to reach the address prefix in the remote domain; and
- invoking load balancing, in cooperation with the hierarchical selection algorithm, to enable the head-end node to balance traffic loads among the one or more appropriate selected TE-LSPs.

17. The method of claim 1, wherein the predetermined TE-LSP attributes comprise bandwidth and cost attributes.

18. The method of claim 1, further comprising: executing the hierarchical selection algorithm based on predetermined prefix attributes of reaching the address prefix from a tail-end node of the TE-LSPs.

19. The system of claim 9, wherein the predetermined TE-LSP attributes comprise bandwidth and cost attributes.

20. The system of claim 9, wherein the hierarchical selection algorithm is based on predetermined prefix attributes of reaching the address prefix from a tail-end node of the TE-LSPs.

21. A method comprising
- executing a hierarchical selection algorithm, at a head-end node of a local domain, to select a traffic engineering (TE) label switched path (LSP) from among a plurality of TE-LSPs, each TE-LSP spanning multiple domains of a computer network from the local domain to a remote domain in order to reach one or more address prefixes within the remote domain, the hierarchical selection algorithm
  - examining predetermined TE-LSP attributes of the inter-domain TE-LSPs in a hierarchical manner by order of predetermined preference for each address prefix reachable by the TE-LSPs, and
  - selecting one or more appropriate TE-LSPs for a preferred TE-LSP attribute to reach the address prefix in the remote domain; and
- sending, by the head-end node, traffic over the one or more appropriate selected TE-LSPs.

22. A method comprising
- executing a weighted selection algorithm, at a head-end node of a local domain, to select a traffic engineering (TE) label switched path (LSP) from among a plurality of TE-LSPs, each TE-LSP spanning multiple domains of a computer network from the local domain to a remote domain in order to reach one or more address prefixes within the remote domain, the weighted selection algorithm
  - evaluating an objective polynomial function for each of the TE-LSPs, the polynomial function configured to characterize the overall preference of the TE-LSPs, and
  - selecting the one or more TE-LSPs with the highest overall preference to reach the address prefix in the remote domain; and
- sending, by the head-end node, traffic over the one or more appropriate selected TE-LSPs.

* * * * *

UNITED STATES PATENT AND TRADEMARK OFFICE
CERTIFICATE OF CORRECTION

PATENT NO. : 7,646,719 B2 Page 1 of 1
APPLICATION NO. : 11/001784
DATED : January 12, 2010
INVENTOR(S) : Jean-Philippe Vasseur It is certified that error appears in the above-identified patent and that said Letters Patent is hereby corrected as shown below:

Col. 1, Line 56, should read

-- routing protocols are used to inter[[-]]connect nodes of the vari- --

Col. 2, Line 12, should read

-- (RFC) 1771, entitled *A Border Gateway Protocol 4* [[*(BGPx-*]] BGP- --

Col. 6, Line 65, should read

-- warding information data[[-]]base (not shown) containing, e.g., --

Col. 8, Line 17, should read

-- ing a TE-LSP from among a plurality of[[ TE-LSPS]] TE-LSPs, each of --

Signed and Sealed this

Third Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,646,719 B2
APPLICATION NO. : 11/001784
DATED : January 12, 2010
INVENTOR(S) : Vasseur et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1440 days.

Signed and Sealed this

Twenty-eighth Day of December, 2010

David J. Kappos
*Director of the United States Patent and Trademark Office*